Oct. 24, 1961   J. P. KELLER ET AL   3,005,855
PRODUCTION OF CYCLIC HYDROCARBONS
Filed May 28, 1959
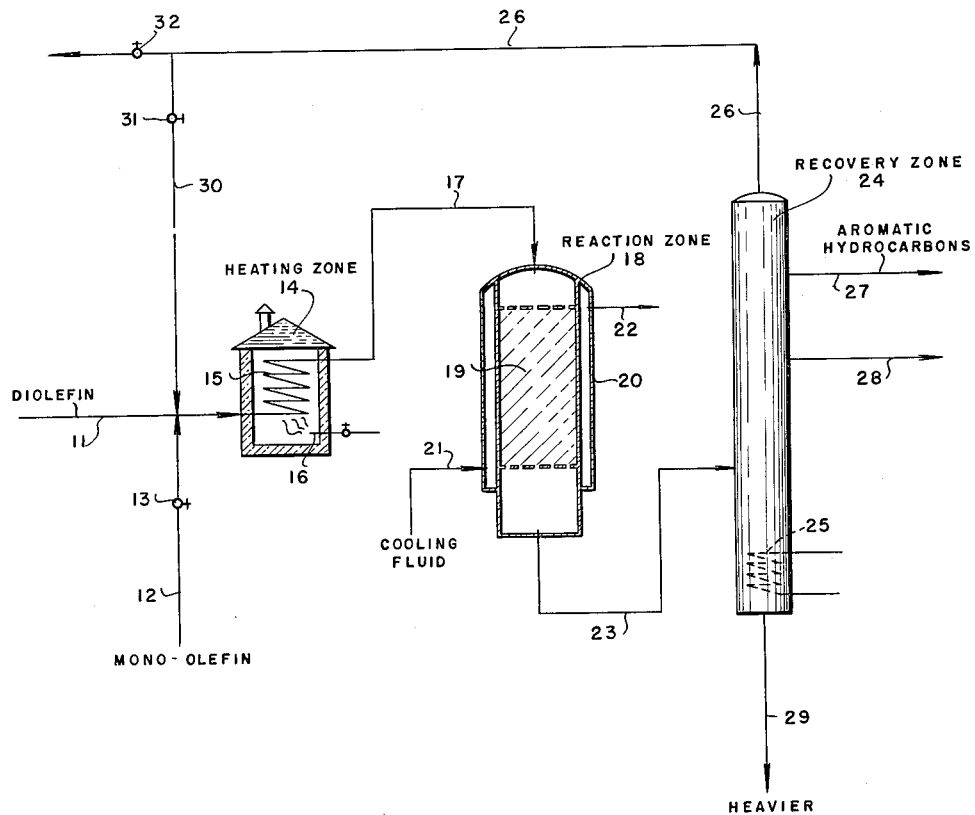
INVENTORS.
JAMES P. KELLER,
HENRY G. SCHUTZE,
BY  ALBERT T. WATSON,
ATTORNEY.

3,005,855
PRODUCTION OF CYCLIC HYDROCARBONS
James P. Keller and Henry G. Schutze, Baytown, Tex., and Albert T. Watson, Decatur, Ala., assignors, by mesne assignments, to Esso Research and Engineering Company, Elizabeth, N.J., a corporation of Delaware
Filed May 28, 1959, Ser. No. 816,595
11 Claims. (Cl. 260—673)

The present invention is directed to a method of producing cyclic hydrocarbons. More particularly, the invention is concerned with producing aromatic hydrocarbons. In its most specific aspects, the invention is concerned with producing cyclic hydrocarbons in the gasoline boiling range.

The present invention may be briefly described as a method for producing cyclic hydrocarbons in which a diolefin having 4 to 5 carbon atoms in the molecule is contacted with a reduced cobalt molybdate catalyst at a temperature within the range from about 400° to about 500° F. and preferably at about the vapor pressure of the diolefin at said temperature, although pressures from about 1 to about 100 atmospheres may be used. Under these conditions, a product is formed which contains substantial amounts of cyclic hydrocarbons which may be recovered from the product.

The diolefins forming the feedstock of the present invention are the acyclic diolefins having 4 to 5 carbon atoms in the molecule as illustrated by 1,2-butadiene, 1,3-butadiene, 1,2-pentadiene, 1,3-pentadiene, 1,4-pentadiene, 2,3-pentadiene, 3-methyl-1,2-butadiene, 2-methyl-1,3-butadiene.

It is contemplated in the practice of the present invention that monoolefins having 2 to 5 carbon atoms in the molecule may be admixed with the diolefin. For example, ethylene, propylene, butylenes, or pentylenes may be admixed with the diolefins.

While the purified diolefins and monoolefins may be used in the practice of the present invention, hydrocarbon fractions containing the diolefins and monoolefins may be used. It is desirable, however, that the diolefins or the monoolefins be freed of contaminants such as volatile metal compounds and active oxygen, sulfur, and nitrogen compounds which may affect the reaction deleteriously or deactivate the catalyst.

The catalyst employed in the practice of the present invention is cobalt molybdate in a reduced condition. For example, the cobalt molybdate may be suitably reduced with hydrogen at a temperature of about 1000° F. for about 16 hours to give satisfactory results. The reduced catalyst may be used on a suitable support. For example, the catalyst may be supported on alumina such as gamma alumina or purified alumina, zirconia, magnesia, and the like. When the cobalt molybdate is supported on a carrier, it may be used in an amount from about 10 to about 20 percent by weight of the total catalyst.

The present invention will be further illustrated by reference to the drawing in which the single figure is a flow diagram of a preferred mode.

Referring now to the drawing, 11 designates a charge line by way of which a diolefin such as butadiene is introduced into the system from a source not shown. Under some conditions, it may be desired to introduce into line 11 for admixture with the diolefin a monoolefin, of the type illustrated supra, through line 12 controlled by valve 13. The diolefin alone, or in admixture with the monoolefin, is then flowed into a heating zone 14 provided with a heating coil 15. Heating zone 14 has heat supplied thereto from gas burners 16. The heated diolefin is then flowed by way of line 17 into a reaction zone 18 which suitably is provided with a bed 19 of supported cobalt molybdate catalyst. Reaction zone 18 is provided with a jacket 20 into which a cooling fluid may be flowed by way of line 21 and outwardly therefrom by way of line 22 to control the reaction. The reactants are flowed through the reaction zone 18 at a liquid space velocity in the range from about 0.05 to about 5.0 v./v./hour with a preferred liquid spaced velocity in the range from about 0.1 to about 1.5 v./v./hour. Under the conditions obtaining in zone 18, and at the temperatures mentioned supra, the diolefin is converted to a cyclic hydrocarbon, the pressures in zone 18 being at about the vapor pressure of the diolefin at the conditions of temperature employed. A product is discharged by line 23 from zone 18 and this product contains substantial amounts of cyclic hydrocarbons. When the feedstock is diolefin such as butadiene, a product containing substantial amounts of orthoxylene is obtained. The product discharges by line 23 into a recovery zone 24 which may be a suitable fractional distillation tower equipped with internal vapor-liquid contacting means and provided with all auxiliary equipment usually associated with the modern distillation tower. Such auxiliary equipment will include means for inducing reflux, cooling means, and condensing means, and the like. Distillation tower 24 is provided with a heating means illustrated by steam coil 25 and is further provided with lines 26, 27, 28, and 29. By adjusting temperature and pressure conditions in distillation tower 24 light fractions and/or unconverted feedstock may be removed overhead therefrom while the desired aromatic hydrocarbons may be taken off by lines 27 and 28 depending on the boiling point of the product. Heavier products may be removed by line 29. Unreacted diolefin and/or mono-olefin may be recycled to line 11 by way of line 26 and line 30 controlled by valve 31. Under some circumstances it may be desirable to discharge the light products and unreacted feed by opening valve 32 in line 26.

By operating in accordance with the preferred mode, cyclic hydrocarbons may be produced from diolefins and/or monoolefins.

The invention is quite advantageous and useful in that desirable aromatic hydrocarbons may be produced from diolefinic and monolefin hydrocarbons. Aromatic hydrocarbons are quite useful as solvents and as ingredients for high octane motor and aviation fuel.

The invention will be further illustrated by reference to the following runs. In the first run, butadiene was contacted with reduced cobalt molybdate catalysts at a liquid space velocity of about 1 v./v./hour and at a temperature ranging from about 420° to about 480° F. at about the vapor pressure of the butadiene at that temperature which was 40 pounds per square inch gauge. Liquid products representing 25% conversion were obtained. The liquid products were analyzed and found to contain ethylbenzene and orthoxylene in a ratio of about 5.5 to 1.

Another run was made under similar conditions in which cis-butene-2 and butadiene were charged over the cobalt molybdate catalyst in a ratio of 4 to 1 under the conditions substantially as outlined in the previous operation. In this run, a considerably larger fraction of the $C_8$ aromatic product was orthoxylene. The ethylbenzene to orthoxylene ratio in this operation was about 1.3 to 1.

Other operations are suitably conducted charging a feedstock of butadiene and ethylene with the butadiene and ethylene being in a ratio of about 0.01 to 0.1 to 1. In this operation, the product is found to contain substantial quantities of benzene.

Other operations are conducted with butadiene and propylene to obtain cyclic hydrocarbons.

Still further operations are conducted with pentadiene alone and in admixture with monoolefins having 2 to 5 carbon atoms in the molecule to form products containing substantial quantities of cyclic hydrocarbons of the nature of aromatics and naphthenes.

From these operations, it may be seen that the present invention is of considerable advantage and utility in producing cyclic hydrocarbons which are valuable in various reactions and also in solvents and in motor fuels as mentioned supra.

The nature and objects of the present invention having been completely described and illustrated, what we wish to claim as new and useful and to secure by Letters Patent is:

1. A method for producing cyclic hydrocarbons which consists of contacting an acyclic diolefin having 4 to 5 carbon atoms in the molecule with a reduced cobalt molybdate catalyst at a temperature within the range from about 400° to about 500° F. to form a product containing substantial amounts of cyclic hydrocarbons, said catalyst being reduced with hydrogen at a temperature of about 1000° F. for about 16 hours.

2. A method in accordance with claim 1 in which a monoolefin having 2 to 5 carbon atoms in the molecule is admixed with the diolefin.

3. A method in accordance with claim 1 in which the catalyst is supported on alumina.

4. A method in accordance with claim 1 in which the diolefin is butadiene.

5. A method in accordance with claim 1 in which the diolefin is butadiene and ethylene is admixed therewith.

6. A method in accordance with claim 1 in which the diolefin is butadiene and butylene is admixed therewith.

7. A method in accordance with claim 1 in which a pressure about the vapor pressure of the diolefin at said temperature is employed.

8. A method in accordance with claim 1 in which a pressure in the range from about 1 to about 100 atmospheres is used.

9. A method for producing aromatic hydrocarbons which consists of contacting butadiene with a reduced cobalt molybdate catalyst at a temperature within the range from about 420° to about 480° F. and at about the vapor pressure of the butadiene at said temperature to form a product containing a substantial amount of aromatic hydrocarbons, said catalyst being reduced with hydrogen at a temperature of about 1000° F. for about 16 hours.

10. A method in accordance with claim 9 in which a butylene is admixed with the butadiene.

11. A method in accordance with claim 9 in which the butylene and butadiene are admixed in a ratio of about 4:1.

References Cited in the file of this patent

UNITED STATES PATENTS

| | | |
|---|---|---|
| 2,172,535 | Grosse et al. | Sept. 12, 1939 |
| 2,392,960 | Watson | Jan. 15, 1946 |
| 2,544,808 | Stahly | Mar. 13, 1951 |
| 2,584,531 | Arnold et al. | Feb. 5, 1952 |

FOREIGN PATENTS

| | | |
|---|---|---|
| 1,050,059 | France | Jan. 5, 1954 |

OTHER REFERENCES

Schneider et al.: "Industrial and Engineering Chemistry," December 1931, pages 1405–1409.